US011887526B2

(12) United States Patent
Akiba

(10) Patent No.: US 11,887,526 B2
(45) Date of Patent: Jan. 30, 2024

(54) CIRCUIT DEVICE HAVING A COLOR REDUCTION CIRCUIT AND AN IMAGE CONVERSION CIRCUIT EXECUTING INTERPOLATION PROCESSING

(71) Applicant: SEIKO EPSON CORPORATION, Tokyo (JP)

(72) Inventor: Yasutoshi Akiba, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 18/086,704

(22) Filed: Dec. 22, 2022

(65) Prior Publication Data

US 2023/0206814 A1 Jun. 29, 2023

(30) Foreign Application Priority Data

Dec. 27, 2021 (JP) ................................ 2021-211997

(51) Int. Cl.
*G09G 3/20* (2006.01)

(52) U.S. Cl.
CPC ... *G09G 3/2066* (2013.01); *G09G 2320/0271* (2013.01); *G09G 2340/06* (2013.01); *G09G 2360/12* (2013.01)

(58) Field of Classification Search
CPC ......... G09G 3/2066; G09G 2320/0271; G09G 2340/06; G09G 2360/12; G09G 5/04; G09G 3/2059; G09G 3/2044; G09G 3/3607; G09G 3/3611; G06K 15/1877; G06T 3/4007; H04N 1/58; G03B 5/00
See application file for complete search history.

(56) References Cited

U.S. PATENT DOCUMENTS

| | | | | |
|---|---|---|---|---|
| 9,390,471 | B1 * | 7/2016 | Orio | G06T 3/4007 |
| 2002/0080146 | A1 | 6/2002 | Ikeda et al. | |
| 2003/0016199 | A1 * | 1/2003 | Lee | G09G 3/3607 345/88 |
| 2003/0184508 | A1 * | 10/2003 | Lee | G09G 3/3611 345/87 |
| 2004/0184056 | A1 * | 9/2004 | Ikeda | H04N 1/58 358/1.9 |
| 2009/0184983 | A1 * | 7/2009 | Nose | G09G 5/04 345/690 |

(Continued)

FOREIGN PATENT DOCUMENTS

| | | |
|---|---|---|
| JP | H08-317393 A | 11/1996 |
| JP | 2002-221950 A | 8/2002 |

*Primary Examiner* — Richard J Hong
(74) *Attorney, Agent, or Firm* — Harness, Dickey & Pierce, P.L.C.

(57) ABSTRACT

A circuit device includes: a color reduction circuit configured to execute color reduction processing from input image data in which pixel data is m bits to color-reduced image data in which pixel data is n bits, and configured to apply spatial error diffusion or temporal error diffusion in the color reduction processing; a storage circuit storing the color-reduced image data; and an image conversion circuit configured to execute image conversion processing, which is at least one of mapping processing and scaling processing, on the color-reduced image data stored in the storage circuit to output output image data, and configured to execute interpolation processing, which is in the image conversion processing, of generating pixel data of the output image data from a plurality of pieces of pixel data of the color-reduced image data.

10 Claims, 12 Drawing Sheets

(56) References Cited

U.S. PATENT DOCUMENTS

2013/0215326 A1* 8/2013 Sato ..................... G09G 3/2059
348/453
2013/0241963 A1* 9/2013 Nose .................... G09G 3/2059
345/88
2013/0242126 A1* 9/2013 Motoda ................. G06T 3/4007
348/222.1
2014/0010479 A1* 1/2014 Kwon ................... G06T 3/4007
382/300
2015/0364071 A1* 12/2015 Iida ...................... G09G 3/2044
345/691
2016/0205282 A1* 7/2016 Metcalfe ............ G06K 15/1877
358/448
2018/0047326 A1* 2/2018 Tsuchida .............. G09G 3/2059
2021/0314473 A1* 10/2021 Okiyama ................. G03B 5/00

* cited by examiner

CIRCUIT DEVICE HAVING A COLOR REDUCTION CIRCUIT AND AN IMAGE CONVERSION CIRCUIT EXECUTING INTERPOLATION PROCESSING

The present application is based on, and claims priority from JP Application Serial Number 2021-211997, filed Dec. 27, 2021, the disclosure of which is hereby incorporated by reference herein in its entirety.

BACKGROUND

1. Technical Field

The present disclosure relates to a circuit device and a display device.

2. Related Art

JP-A-2002-221950 (Patent Literature 1) discloses a display device including a pseudo gradation processing unit configured to color-reduce each of RGB components of display data from 6 bits to 3 bits to 5 bits; a frame memory storing color-reduced display data; a gradation correction unit configured to increase, using a bit conversion table, number of bits of each of the RGB components of the color-reduced display data stored in the frame memory into 6 bits; and a drive unit configured to drive, using the display data whose number of bits is increased, a display device.

In Patent Literature 1, after the display data is color-reduced and stored in the frame memory, the color-reduced display data is returned to an original number of bits by using the bit conversion table. Therefore, image quality is simply degraded by an amount of reduced number of bits of the display data in color reduction.

SUMMARY

An aspect of the present disclosure relates to a circuit device including: a color reduction circuit configured to execute color reduction processing from input image data in which pixel data is m bits, m being an integer of 2 or more, to color-reduced image data in which pixel data is n bits, n being an integer of 1 or more and less than m, and configured to execute error diffusion processing in a space direction or in a time direction in the color reduction processing; a storage circuit storing the color-reduced image data; and an image conversion circuit configured to execute interpolation processing, which is in the image conversion processing being at least one of mapping processing and scaling processing on the color-reduced image data stored in the storage circuit, of generating pixel data of the output image data from a plurality of pieces of pixel data of the color-reduced image data.

Another aspect of the present disclosure relates to a display device including the circuit device described above; and an image display unit on which an image based on the output image data is displayed.

DESCRIPTION OF EXEMPLARY EMBODIMENTS

Thereafter, a preferred embodiment according to the present disclosure will be described in detail. The present embodiment to be described below does not unduly limit contents described in the appended claims, and not all configurations described in the present embodiment are necessarily essential constituent elements.

1. Display Device and Circuit Device

Figure 1:
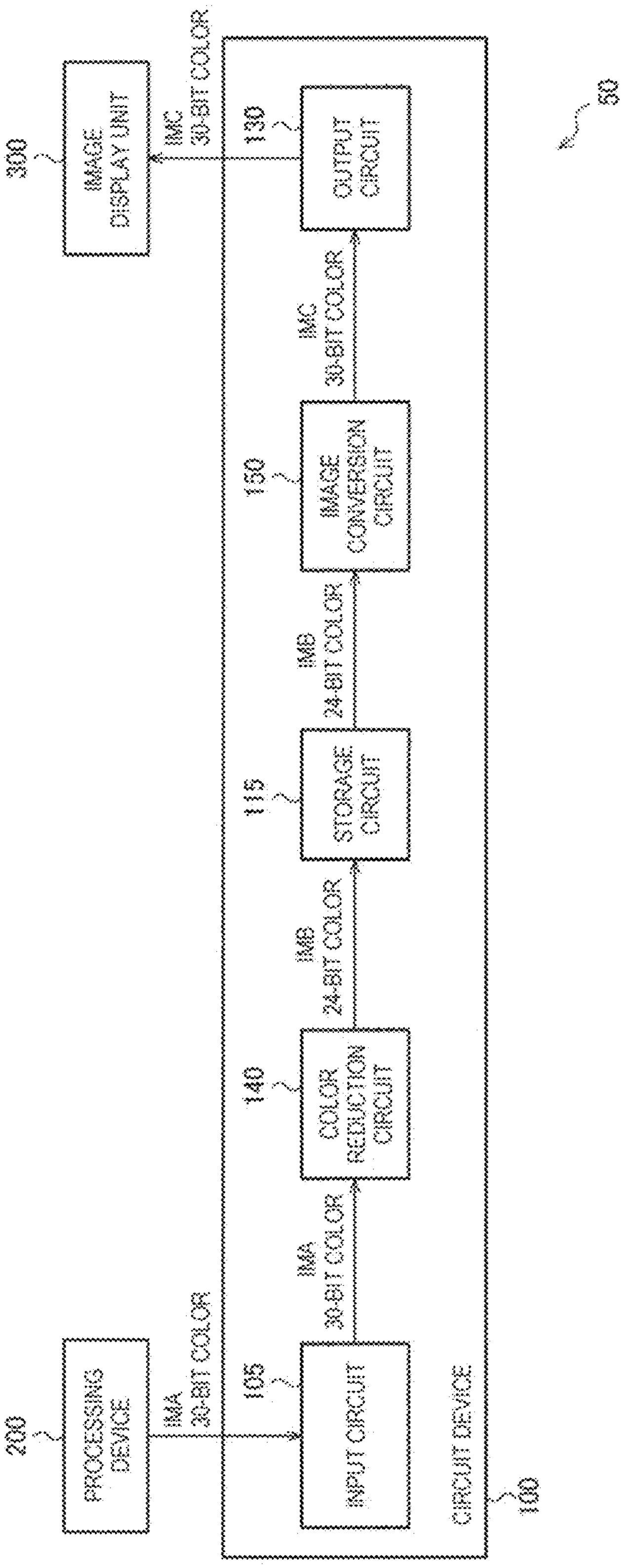
FIG. 1 is a configuration example of a display device and a circuit device.

FIG. 1 shows a configuration example of a display device 50 and a circuit device 100 according to the present embodiment. The display device 50 includes the circuit device 100, a processing device 200, and an image display unit 300. The display device 50 is, for example, a head-up display device or a display provided on an in-vehicle cluster panel of an automobile.

The processing device 200 transmits input image data IMA to the circuit device 100. Pixel data of each pixel of the input image data IMA is 30 bits. Specifically, the pixel data is 30-bit color data including 10-bit R color data, 10-bit G color data, and 10-bit B color data. The processing device 200 is a so-called SoC, and is, for example, a processor such as a CPU or a microcomputer. SoC is an abbreviation for system on chip. CPU is an abbreviation for central processing unit.

The circuit device 100 includes an input circuit 105, a color reduction circuit 140, a storage circuit 115, an image conversion circuit 150, and an output circuit 130. The circuit device 100 is, for example, an integrated circuit device in which a plurality of circuit elements are integrated on a semiconductor substrate.

The input circuit 105 receives the input image data IMA from the processing device 200. The input circuit 105 may be a reception circuit for various communication interfaces, and is, for example, a reception circuit for an LVDS, a DVI, a display port, a GMSL, or a GVIF. LVDS is an abbreviation for low voltage differential signaling, DVI is an abbreviation for digital visual interface, GMSL is an abbreviation for gigabit multimedia serial link, and GVIF is an abbreviation for gigabit video interface.

The color reduction circuit 140 color-reduces the pixel data of each pixel of the input image data IMA from 30 bits to 24 bits, and outputs a result of the color reduction as color-reduced image data IMB. Specifically, the color reduction circuit 140 color-reduces the color data of each color from 10 bits to 8 bits. The pixel data of each pixel of the color-reduced image data IMB is 24-bit color data including 8-bit R color data, 8-bit G color data, and 8-bit B color data.

The color reduction circuit 140 executes, in color reduction processing, error diffusion processing in a space direction or in a time direction. The error diffusion processing is processing of diffusing an error between 30-bit pixel data before color reduction and 24-bit pixel data after the color reduction. When a color-reduced image is averagely viewed in a range in which the error is diffused, a color corresponding to a color before the color reduction is expressed. Error diffusion processing in the space direction is processing of diffusing an error of color reduction in a certain pixel into pixel data of pixels around the certain pixel. Error diffusion in the time direction is processing of diffusing an error of color reduction of a pixel in a certain frame into pixel data of pixels in frames subsequent to the certain frame.

The storage circuit 115 temporarily stores the color-reduced image data IMB, and functions as a buffer memory for image conversion processing executed by the image conversion circuit 150. The storage circuit 115 is, for example, a line buffer. The image conversion processing is image conversion accompanying movement of a pixel position, and a line buffer is used in which the number of lines is larger than a maximum movement amount of the pixel position in a vertical direction. Alternatively, the storage circuit 115 may be a frame memory buffering the color-reduced image data IMB of one frame.

The image conversion circuit 150 executes image conversion processing on the color-reduced image data IMB, and outputs a result of the image conversion processing as output image data IMC. The image conversion processing is processing of deforming or enlarging or reducing an image by coordinate conversion, and specifically, is mapping processing, scaling processing, or processing combining the mapping processing and the scaling processing. The mapping processing is processing of converting an image according to any mapping between coordinates on the color-reduced image data IMB and coordinates on the output image data IMC. The scaling processing is processing of enlarging or reducing an image centering on a reference point on the image.

The image conversion circuit 150 generates pixel data of the output image data IMC from a plurality of pieces of pixel data of the color-reduced image data IMB by executing interpolation processing in the image conversion processing. The pixel data of each pixel of the output image data IMC is 30 bits. That is, in the interpolation processing, the image conversion circuit 150 obtains 10-bit R color data of the output image data IMC from the 8-bit R color data of the color-reduced image data IMB, obtains 10-bit G color data of the output image data IMC from the 8-bit G color data of the color-reduced image data IMB, and obtains 10-bit B color data of the output image data IMC from the 8-bit B color data of the color-reduced image data IMB. As will be described later with reference to FIG. 9, the image conversion circuit 150 may output the output image data IMC in which the pixel data of each pixel is 24 bits.

The output circuit 130 transmits the output image data IMC to the image display unit 300. The output circuit 130 may be a transmission circuit for various communication interfaces, and is, for example, a transmission circuit for an LVDS, a DVI, a display port, a GMSL, or a GVIF.

The image display unit 300 displays an image based on the output image data IMC. Specifically, the image display unit 300 includes a display panel, a display controller controlling a display timing, and a display driver driving, based on the output image data IMC and a timing control signal from the display controller, the display panel to display an image on the display panel. The display panel is a liquid crystal display panel, a self-luminous display panel, or the like. A configuration of the image display unit 300 is not limited thereto, and may be, for example, an HUD 350 described later with reference to FIG. 2.

In the above description, the input image data IMA and the output image data IMC have a 30-bit color, and the color-reduced image data IMB has a 24-bit color, but the present disclosure is not limited to this. When m is an integer of 2 or more and n is an integer of 1 or more and less than m, the input image data IMA and the output image data IMC may have an m-bit color, and the color-reduced image data IMB may have an n-bit color. As an example, the input image data IMA and the output image data IMC may have a 24-bit color, and the color-reduced image data IMB may have an 18-bit color.

In the present embodiment described above, the circuit device 100 includes the color reduction circuit 140, the storage circuit 115, and the image conversion circuit 150. The color reduction circuit 140 executes the color reduction processing from the input image data IMA in which the pixel data is m bits to the color-reduced image data IMB in which the pixel data is n bits, and executes the error diffusion processing in the space direction or in the time direction in the color reduction processing. The storage circuit 115 stores the color-reduced image data IMB. The image conversion circuit 150 executes the image conversion processing on the color-reduced image data IMB stored in the storage circuit 115 to output the output image data IMC, and executes the interpolation processing in the image conversion processing. The image conversion processing is at least one of the mapping processing and the scaling processing. The interpolation processing is processing of generating, from a plurality of pieces of pixel data of the color-reduced image data IMB, pixel data of the output image data IMC.

According to the present embodiment, since the input image data IMA is stored in the storage circuit 115 after being color-reduced, a storage capacity is saved by $(1-24/30)\times 100\%=20\%$ as compared with a case where the input image data IMA is stored as it is in the storage circuit 115. Accordingly, cost of the circuit device 100 can be reduced.

By executing the error diffusion processing in the space direction or in the time direction in the color reduction processing, the image data is color-reduced to 24-bit color while maintaining gradation information corresponding to 30-bit color as an average of the range in which the error is diffused. By executing the image conversion processing on the 24-bit color color-reduced image data IMB, the pixel data is averaged in the space direction. Therefore, the output image data IMC having a smoother gradation than the color-reduced image data IMB can be obtained. Specifically, both the mapping processing and the scaling processing, which are the image conversion processing, involve coordinate conversion, but in the coordinate conversion, coordinates of a conversion destination may not match a pixel grid. The pixel data of such a pixel is interpolated from pixel data of surrounding pixels, and the pixel data is averaged in the interpolation processing. By averaging the pixel data, the gradation becomes smooth, and an improvement in image quality can be expected.

Although Patent Literature 1 described above discloses that the number of bits is returned to an original number after the display data is color-reduced and stored in the frame memory, neither a disclosure nor a suggestion is made to execute image conversion processing on the color-reduced display data stored in the frame memory or to execute interpolation processing in image conversion processing.

2. First Detailed Configuration Example

Hereinafter, a case where the display device 50 is a head-up display device and the image conversion circuit 150 is a distortion correction circuit 110 will be described as an example.

Figure 2:
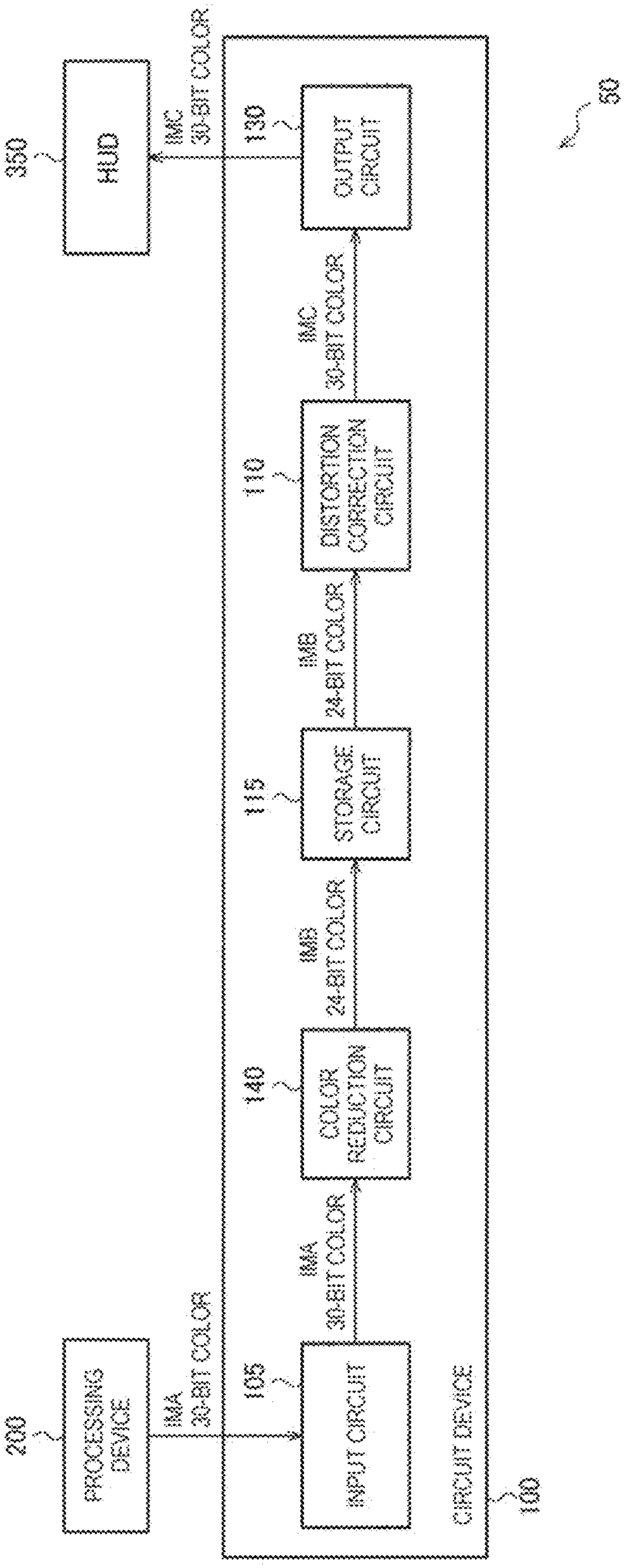
FIG. 2 is a first detailed configuration example of the display device and the circuit device.

FIG. 2 shows a first detailed configuration example of the display device 50 and the circuit device 100. The display device 50 includes the processing device 200, the circuit device 100, and the HUD 350. HUD is an abbreviation for head-up display. Description of similar parts as those in the configuration example of FIG. 1 will be omitted.

The HUD 350 displays, based on the output image data IMC received from the circuit device 100, a virtual image in a field of view of a user. The HUD 350 includes a display controller, a display driver, a display panel, and a projection optical system. The display panel is a liquid crystal display panel, an OLED display panel, or the like. The OLED is an abbreviation for organic light emitting diode. The projection optical system includes a lens, a reflector, or the like, and projects an image displayed on the display panel onto a screen. The screen may be a transparent projection target having a projection surface which reflects projection light. For example, the screen is a wind screen of a moving object on which the display device 50 is mounted.

A configuration of the HUD 350 is not limited to the above. For example, the HUD 350 may include, instead of the display panel and the projection optical system, a laser light source, a mirror reflecting a laser, and an actuator driving the mirror to scan with the laser. Alternatively, the HUD 350 may include, instead of the display panel and the projection optical system, a laser light source and a digital mirror device. The digital mirror device includes an array of micromirrors and an actuator driving the micromirrors.

The circuit device 100 includes the input circuit 105, the color reduction circuit 140, the storage circuit 115, the distortion correction circuit 110, and the output circuit 130. The distortion correction circuit 110 is an example of the image conversion circuit 150 of FIG. 1.

Figure 3:
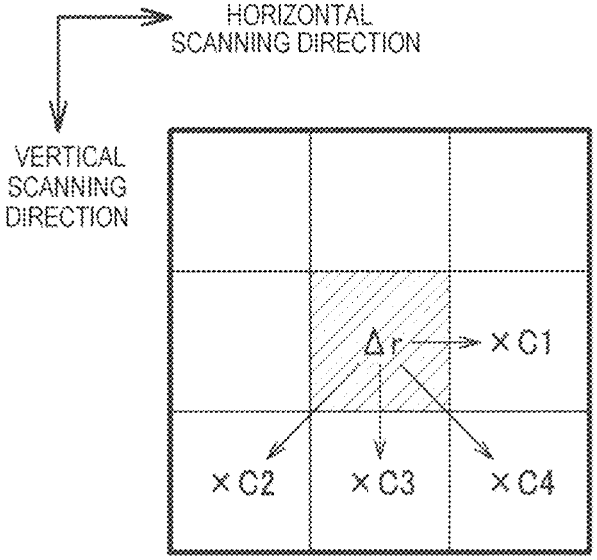
FIG. 3 is a diagram showing error diffusion processing in a space direction.

A detailed example of the error diffusion processing executed by the color reduction circuit 140 will be described. FIG. 3 shows a diagram of the error diffusion processing in the space direction.

The color reduction circuit 140 selects a pixel to be processed from the input image data IMA, and executes color reduction processing on pixel data of the pixel. Here, it is assumed that pixels are sequentially selected by a so-called raster scan method. In FIG. 3, the pixel to be processed is indicated by hatching, and 3×3 pixels around the pixel are indicated. The color reduction circuit 140 adds an error propagated from the surrounding pixels to 30-bit color pixel data, color-reduces the 30-bit color pixel data after the addition to 24-bit color pixel data, and sets a difference between the 30-bit color pixel data and the 24-bit color pixel data as error data Δr. When coordinates of the pixel to be processed are (Xs, Ys), the color reduction circuit 140 propagates Δr×C1 to a pixel of (Xs+1, Ys). Similarly, the color reduction circuit 140 propagates Δr×C2, Δr×C3, and Δr×C4 to pixels of (Xs−1, Ys+1), (Xs, Ys+1), and (Xs+1, Ys+1). C1 to C4 are coefficients, and C1+C2+C3+C4=1. Due to such error diffusion in the space direction, the color-reduced image data IMB includes information corresponding to the 30-bit color before the color reduction.

Figure 4:
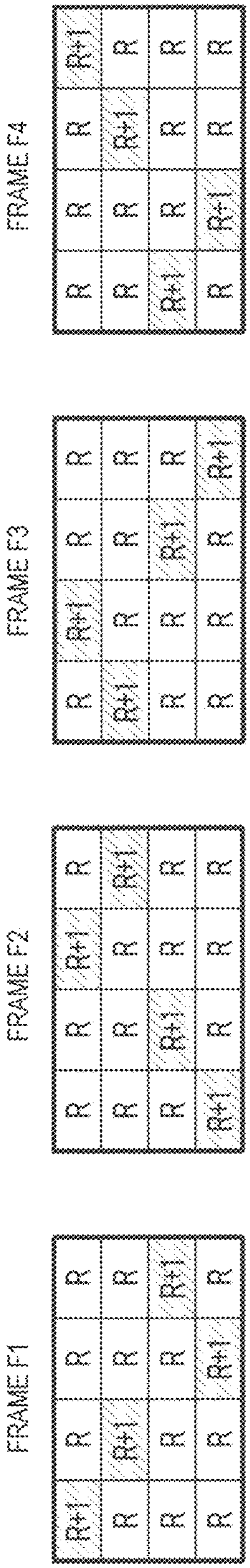
FIG. 4 is a diagram showing FRC as an example of the error diffusion processing in a time direction.

FIG. 4 shows a diagram of FRC as an example of the error diffusion processing in the time direction. FRC is an abbreviation for frame rate control. Frame rates of the input image data IMA before the FRC and of the color-reduced image data IMB after the FRC are the same. Here, the R color data will be described as an example, but similar processing is also executed on the G color data and the B color data.

FIG. 4 shows 4×4 pixels after the FRC. First, description will be given focusing on an upper left pixel. In the 10-bit R color data of the input image data IMA, upper-order 8 bits are set as R, and lower-order 2 bits are set as error data. Here, it is assumed that the error is 0.25. The color reduction circuit 140 sets the R color data in the color-reduced image data IMB to R+1 in the frame F1 and to R in frames F2, F3, and F4. An average of the R color data of the frames F1 to F4 is R+0.25, and the color-reduced image data IMB includes information corresponding to the 30-bit color before the color reduction.

Errors are similarly diffused in the time direction for other pixels, but diffusion timings are different between adjacent pixels. For example, in the frames F1, F2, F3, and F4, upper left pixels are R+1, R, R, and R, while next right pixels of the upper left pixels are R, R, R+1, and R, and timings to become R+1 are different. As a result, an average of 4×4 pixels in each frame is R+0.25. This means that errors are diffused also in the space direction when viewed in units of frames, and it can be said that information corresponding to the 30-bit color before color reduction is included.

Although the case where the error is 0.25 is described here as an example, when the error is 0.5 or 0.75, the FRC is executed such that an average of four frames is 0.5 or 0.75 and the diffusion timings are different between adjacent pixels.

Next, the distortion correction circuit 110 will be described. The distortion correction circuit 110 executes, using coordinate conversion between pixel coordinates in the color-reduced image data IMB and pixel coordinates in the output image data IMC, distortion correction on the color-reduced image data IMB, and outputs a result of the distortion correction as the output image data IMC. The distortion correction is image correction for executing, by applying image distortion, which is opposite to image distortion when an image is projected by the HUD 350, to the image, HUD display without distortion or with reduced distortion. The image distortion is caused by an optical system of the HUD. The image distortion caused by the optical system includes image distortion caused by a curved surface of a screen, image distortion caused by the projection optical system of the HUD, or both of them.

Figure 5:
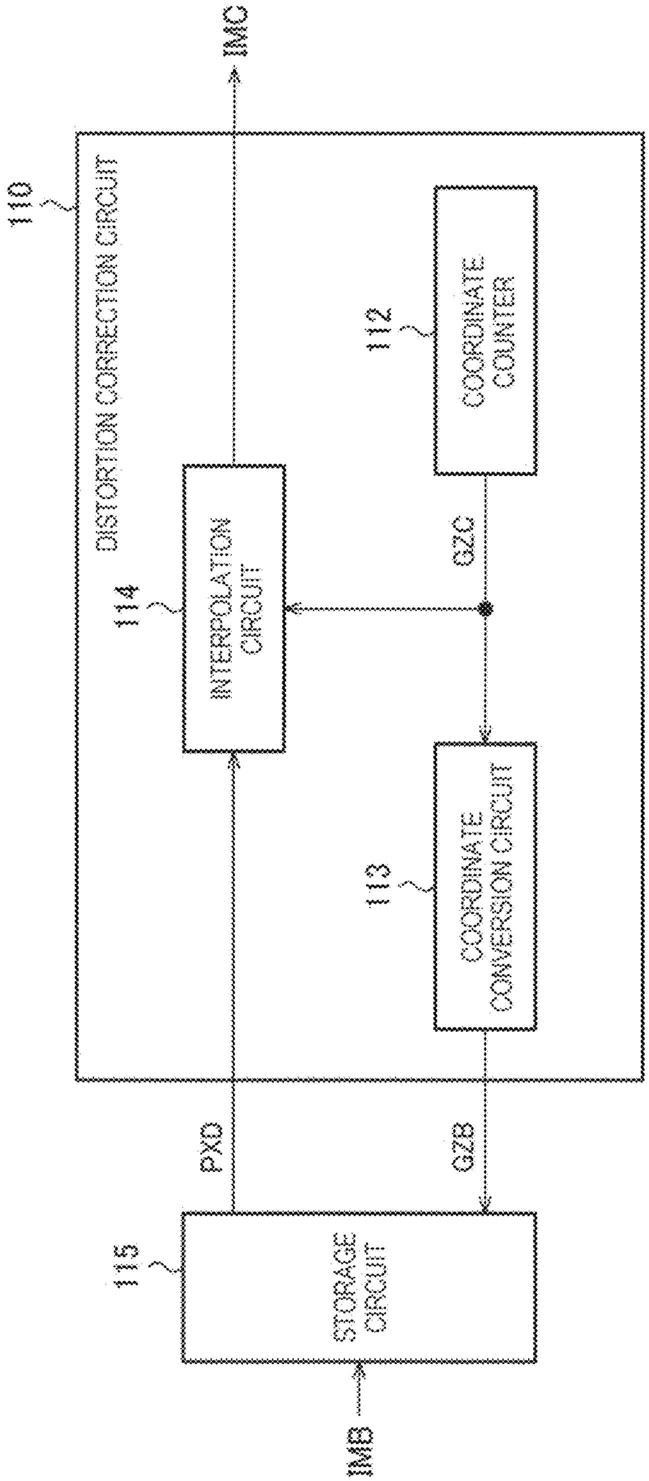
FIG. 5 is a detailed configuration example of a distortion correction circuit.
Figure 6:
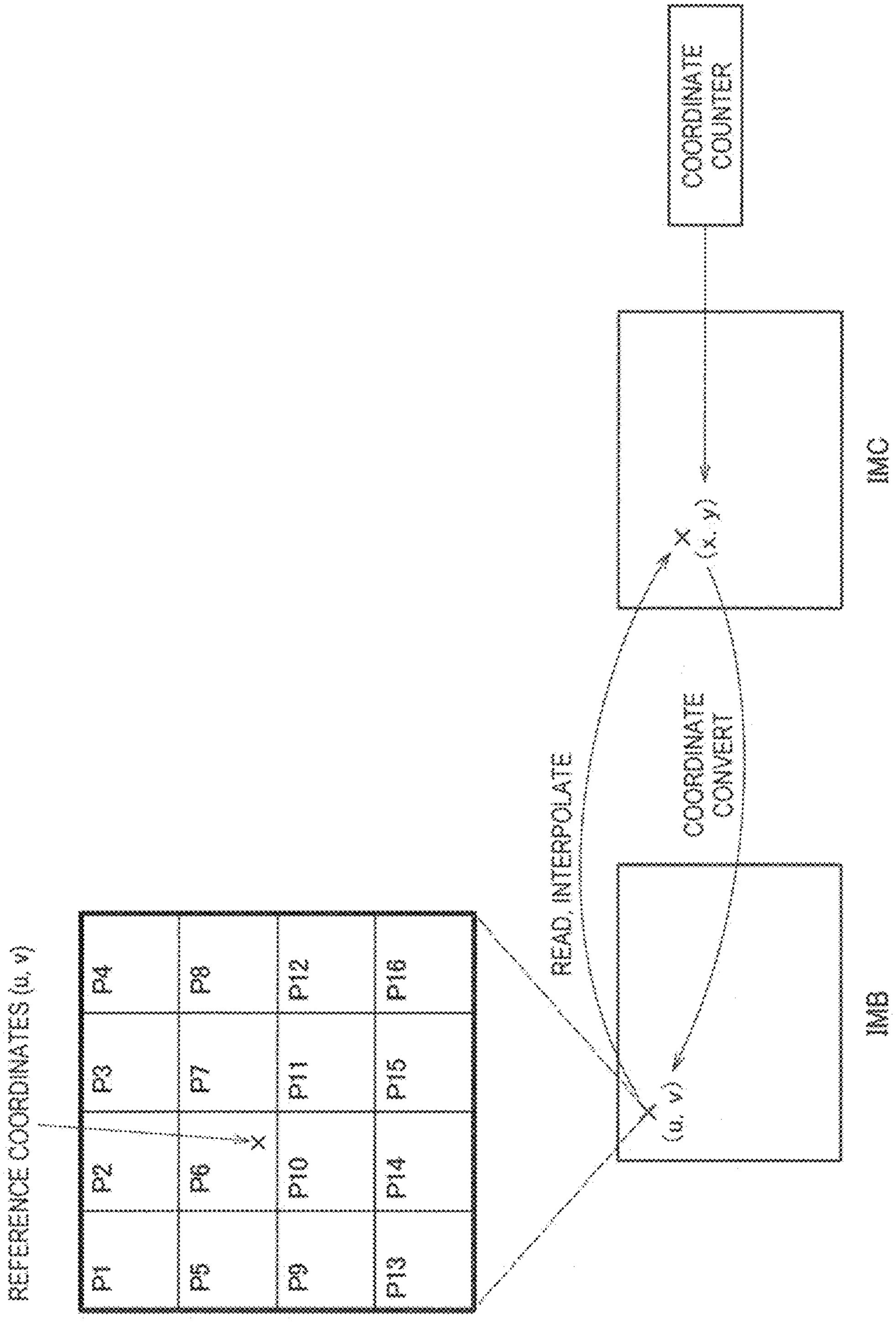
FIG. 6 is a diagram showing an operation of the distortion correction circuit.

FIG. 5 shows a detailed configuration example of the distortion correction circuit 110. The distortion correction circuit 110 includes a coordinate counter 112, a coordinate conversion circuit 113, and an interpolation circuit 114. FIG. 6 is a diagram showing an operation of the distortion correction circuit 110. Here, an example in which the distortion correction circuit 110 is a reverse warp engine will be described.

The coordinate counter 112 outputs pixel coordinates GZC=(x, y) on the output image data IMC. The coordinate conversion circuit 113 converts pixel coordinates (x, y) into reference coordinates GZB=(u, v) which are coordinates on the color-reduced image data IMB. Specifically, the coordinate conversion circuit 113 executes, using a polynomial equation or a table which associates the pixel coordinates (x, y) with the reference coordinates (u, v), coordinate conversion. The coordinate conversion circuit 113 converts the reference coordinates (u, v) into read addresses of a plurality of pixels around the reference coordinates (u, v). The storage circuit 115 outputs a plurality of pieces of pixel data PXD from the read addresses. The interpolation circuit 114 obtains, by executing interpolation processing on the plurality of pieces of read pixel data, pixel data having pixel coordinates (x, y) in the output image data IMC.

FIG. 6 shows an example in which pixel data P1 to P16 of 4×4 pixels around the reference coordinates (u, v) is read. When u and v are integer values, the reference coordinates (u, v) match a pixel grid of the color-reduced image data IMB, but u and v are real values and are not limited to integer values. That is, the reference coordinates (u, v) do not necessarily match the pixel grid of the color-reduced image data IMB. The interpolation circuit 114 obtains, by executing interpolation processing on the pixel data P1 to P16 of 4×4 pixels, pixel data at the reference coordinates (u, v), and sets the pixel data as pixel data of the pixel coordinates (x, y) in the output image data IMC.

Figure 7:
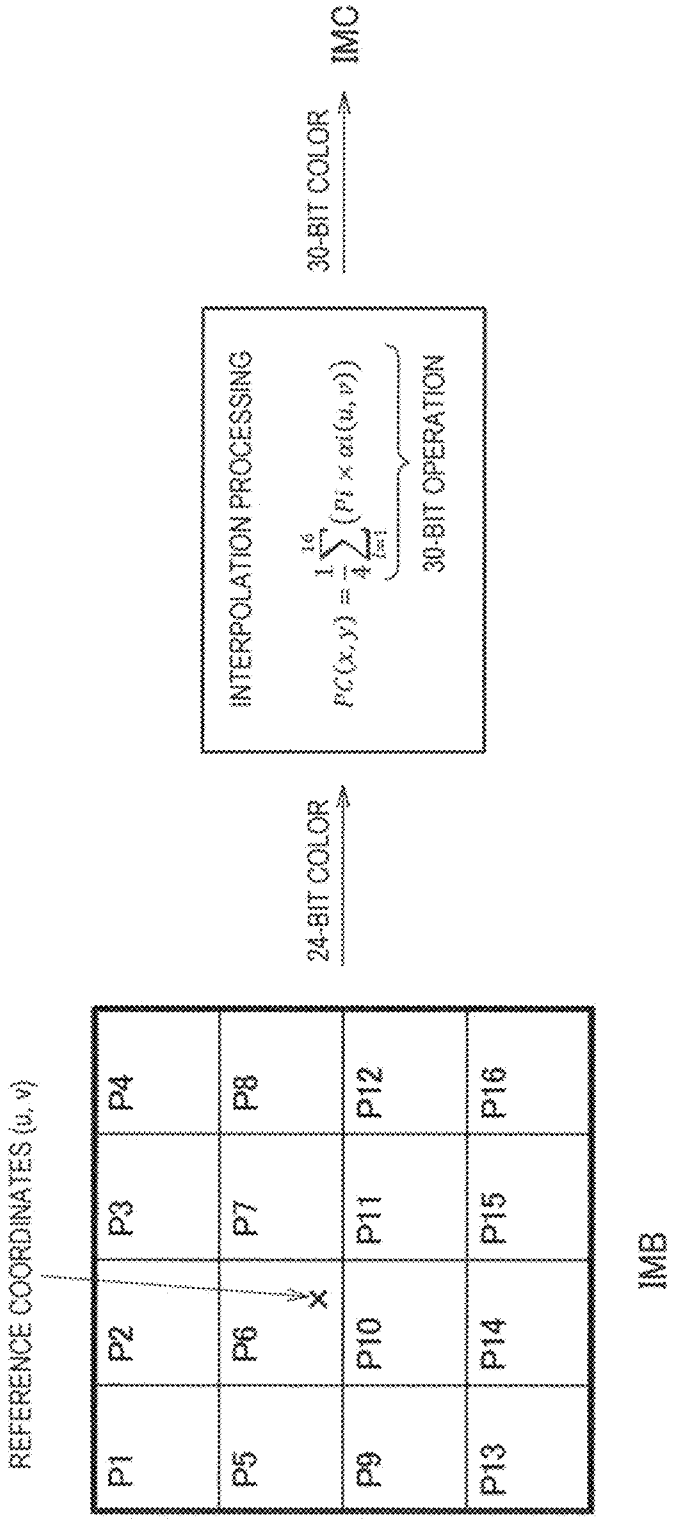
FIG. 7 is a diagram showing interpolation processing in the first detailed configuration example.

FIG. 7 is a diagram showing the interpolation processing in the first detailed configuration example. The pixel data P1 to P16 read from the storage circuit 115 is 24-bit color. The interpolation circuit 114 executes the interpolation processing with a 30-bit operation to obtain, from the 24-bit color pixel data P1 to P16, 30-bit color pixel data PC (x, y). Specifically, the 30-bit operation means that a 10-bit operation is executed on each color data. A middle part of FIG. 7 shows a mathematical expression of the interpolation processing. PC (x, y) is pixel data of the pixel coordinates (x, y) in the output image data IMC. $\alpha i$ (u, v) is an interpolation coefficient and is set according to the reference coordinates (u, v). $\alpha 1+\alpha 2+\ldots+\alpha 16=4$. When $\alpha 1$ to $\alpha 16$ are considered to be a 4×4 matrix corresponding to P1 to P16, a sum of each row is 1, and a sum of each column is 1. The interpolation processing is, for example, bilinear interpolation, but is not limited to the bilinear interpolation, and may be bicubic interpolation or the like.

Figure 8:
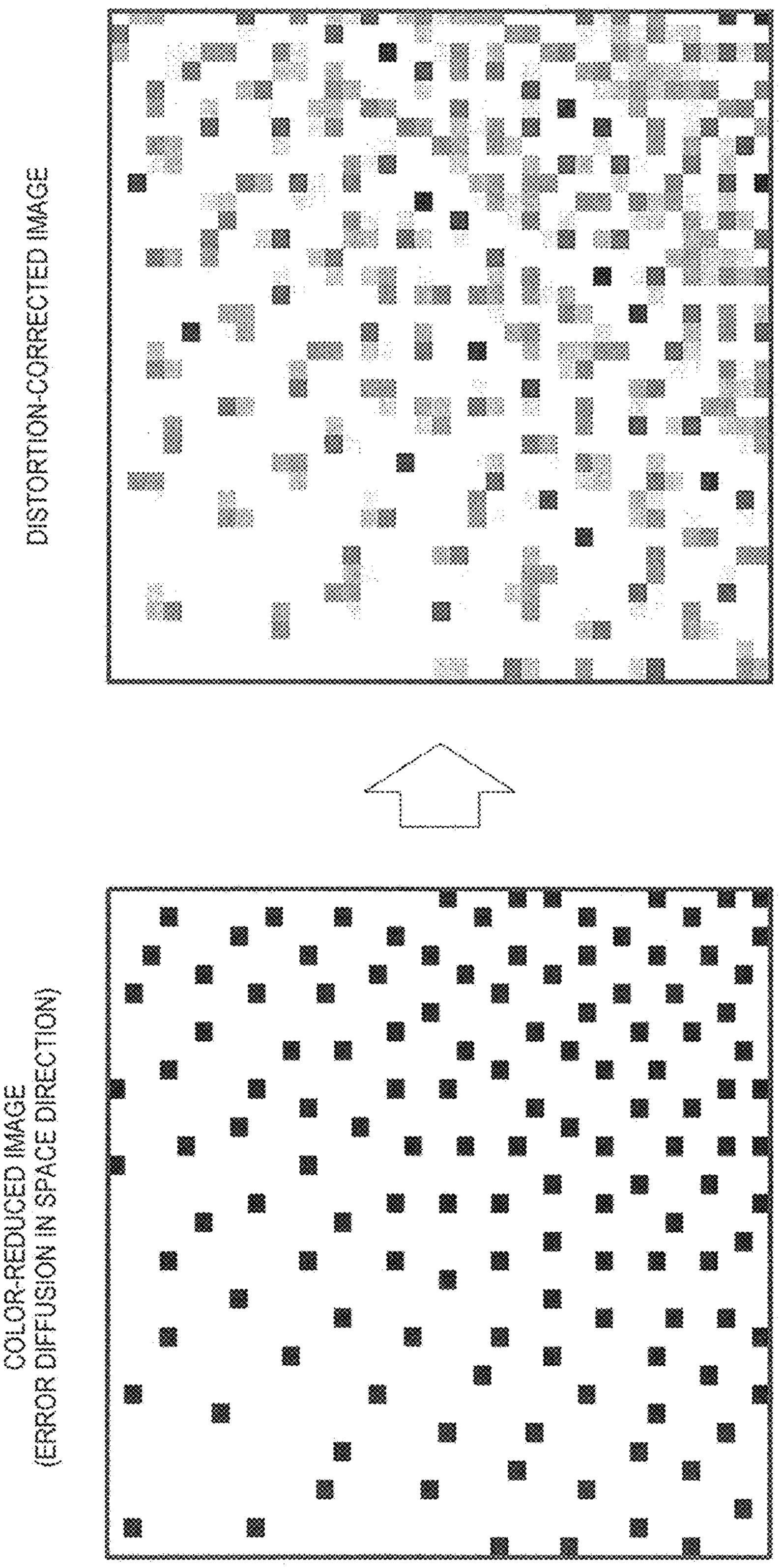
FIG. 8 is examples of images before and after distortion correction.

FIG. 8 shows examples of images before and after distortion correction. Here, an example is shown in which an input image of 8-bit monochrome is color-reduced to an image of 1-bit monochrome, and the image is restored to an image of 8-bit monochrome by the distortion correction.

A left figure is obtained by cutting out a partial region of a color-reduced image subjected to error diffusion in the space direction. The 8-bit monochrome image before the color reduction is a gradation image which becomes darker from the upper left to a lower right of the region. Although binarization is executed by the color reduction, gradation information is reflected by the error diffusion in the space direction. That is, a density of black pixels increases from the upper left to the lower right of the region.

A right figure is obtained by cutting out a partial region corresponding to the left figure from a distortion-corrected image. Since a rectangular region in the left figure is shifted to a distorted region such as a rhombus by the distortion correction, the image in the left figure and the image in the right figure are images of the substantially same portion, but are not images of the completely same portion. In the distortion correction, the 8-bit monochrome image is generated from the 1-bit monochrome image. At this time, the pixel data is averaged in the space direction by the interpolation processing. Accordingly, the distortion-corrected image with an improved gradation can be obtained while inheriting an effect of error diffusion in the color-reduced image. As described with reference to FIG. 4, the FRC also includes the error diffusion in the space direction, thereby obtaining the same effect as described above.

As described above, since the distortion correction is executed after the color reduction, a storage capacity of the line buffer or of the frame memory is saved, and the output image data can be obtained in which the gradation is improved as compared with a case where the color reduction is simply executed.

In the present embodiment described above, the image conversion circuit 150 is the distortion correction circuit 110. The distortion correction circuit 110 converts, in the mapping processing, the pixel coordinates (x, y) on the output image data IMC into the reference coordinates (u, v) on the color-reduced image data IMB. The distortion correction circuit 110 generates the pixel data PC (x, y) of the pixel coordinates (x, y) in the output image data IMC from a plurality of pieces of pixel data P1 to P16 around the reference coordinates (u, v) in the color-reduced image data IMB.

Since the reference coordinates (u, v) do not always match, in the mapping processing, the pixel grid of the color-reduced image data IMB, it is necessary to execute interpolation from a plurality of pieces of surrounding pixel data. Since the pixel data is averaged in the space direction by the interpolation processing, the output image data IMC with an improved gradation can be obtained while inheriting the effect of the error diffusion in the color-reduced image.

In the present embodiment, the distortion correction circuit 110 executes, by the above mapping processing, distortion correction processing on the color-reduced image data IMB. The distortion correction processing is processing of correcting image distortion caused by the optical system of the HUD 350 which projects, based on the output image data IMC, an image onto the projection surface.

According to the present embodiment, in the distortion correction processing, image distortion, which is opposite to image distortion when an image is projected by the HUD 350, is applied to the image. Accordingly, the image distortion at the time of projection is canceled by the image distortion applied to the image by the distortion correction, and the HUD display without distortion or with reduced distortion can be obtained.

In the present embodiment, the color reduction circuit 140 executes the error diffusion processing in the space direction. The distortion correction circuit 110 generates, by the interpolation processing, the output image data IMC in which the pixel data is m bits.

According to the present embodiment, after the m-bit color input image data IMA is color-reduced to the n-bit color color-reduced image data IMB, the color-reduced image data IMB is stored in the storage circuit 115, and the m-bit color output image data IMC is generated from the n-bit color color-reduced image data IMB by the interpolation processing. As described with reference to FIG. 8, by executing multi-gradation from the n-bit color to the m-bit color by the interpolation processing, the output image data IMC with an improved gradation can be obtained while inheriting the effect of the error diffusion in the color-reduced image data IMB.

In the present embodiment, the color reduction circuit 140 may execute frame rate control processing as the error diffusion processing in the time direction. The distortion correction circuit 110 may generate, by the interpolation processing, the output image data IMC in which the pixel data is m bits.

As described with reference to FIG. 4, the error is diffused not only in the time direction but also in the space direction in the FRC, and the image data after the FRC includes information corresponding to m-bit color before the color reduction. Therefore, by executing the multi-gradation from the n-bit color to the m-bit color by the interpolation processing, the output image data IMC with an improved gradation can be obtained while inheriting the effect of the error diffusion in the color-reduced image data IMB.

In the present embodiment, the storage circuit 115 is a line buffer storing image data of a plurality of lines of the color-reduced image data IMB, or a frame memory storing frame image data of the color-reduced image data IMB.

Both the line buffer and the frame memory are image memories, and thus have a relatively large storage capacity. For example, when the pixel data of the input image data IMA increases from 24 bits to 30 bits, a storage capacity of 1.25 times is required, but according to the present embodiment, since the color is reduced to 24 bits, the storage capacity does not increase. Alternatively, when the pixel data of the input image data IMA remains 24 bits, the storage capacity is saved by reducing the color to, for example, 18 bits.

3. Second Detailed Configuration Example

Figure 9:
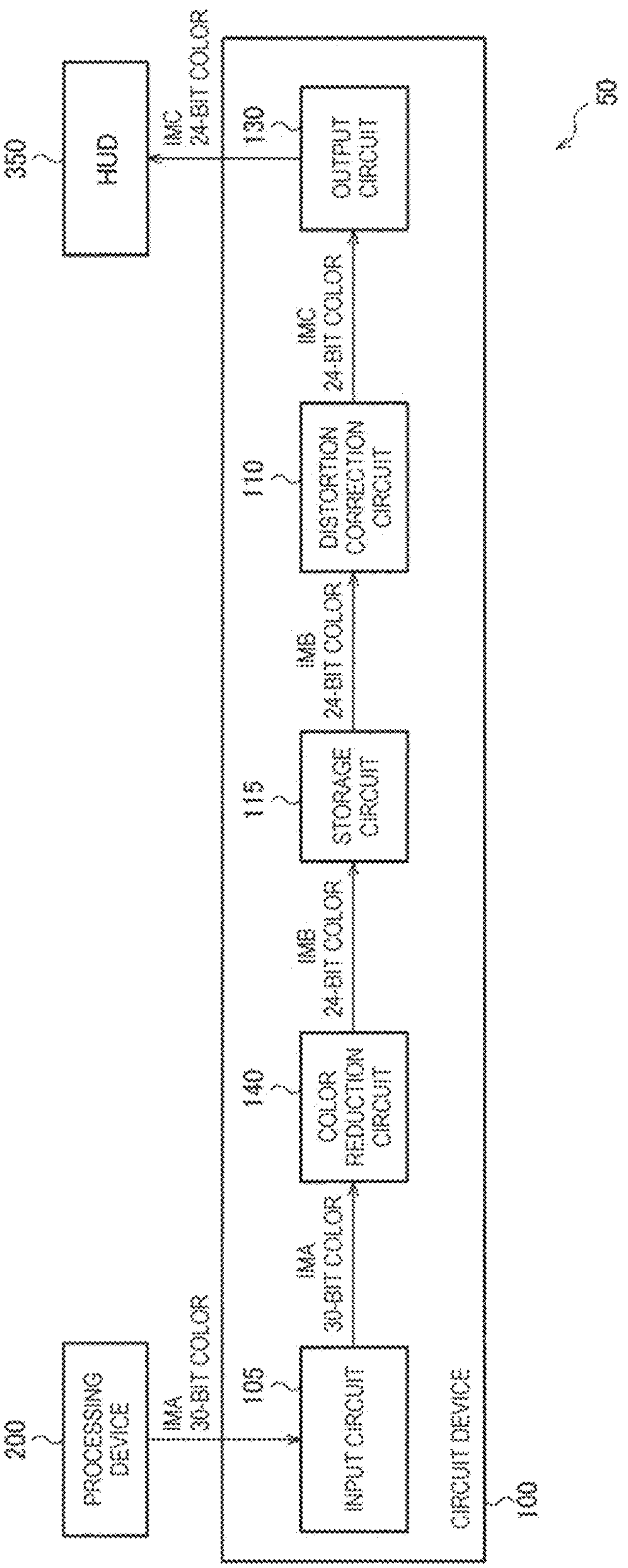
FIG. 9 is a second detailed configuration example of the display device and the circuit device.

FIG. 9 shows a second detailed configuration example of the display device 50 and the circuit device 100. In the second detailed configuration example, the distortion correction circuit 110 outputs the 24-bit color output image data IMC. Description of similar parts as those in the configuration example of FIG. 1 or FIG. 2 will be omitted.

Figure 10:
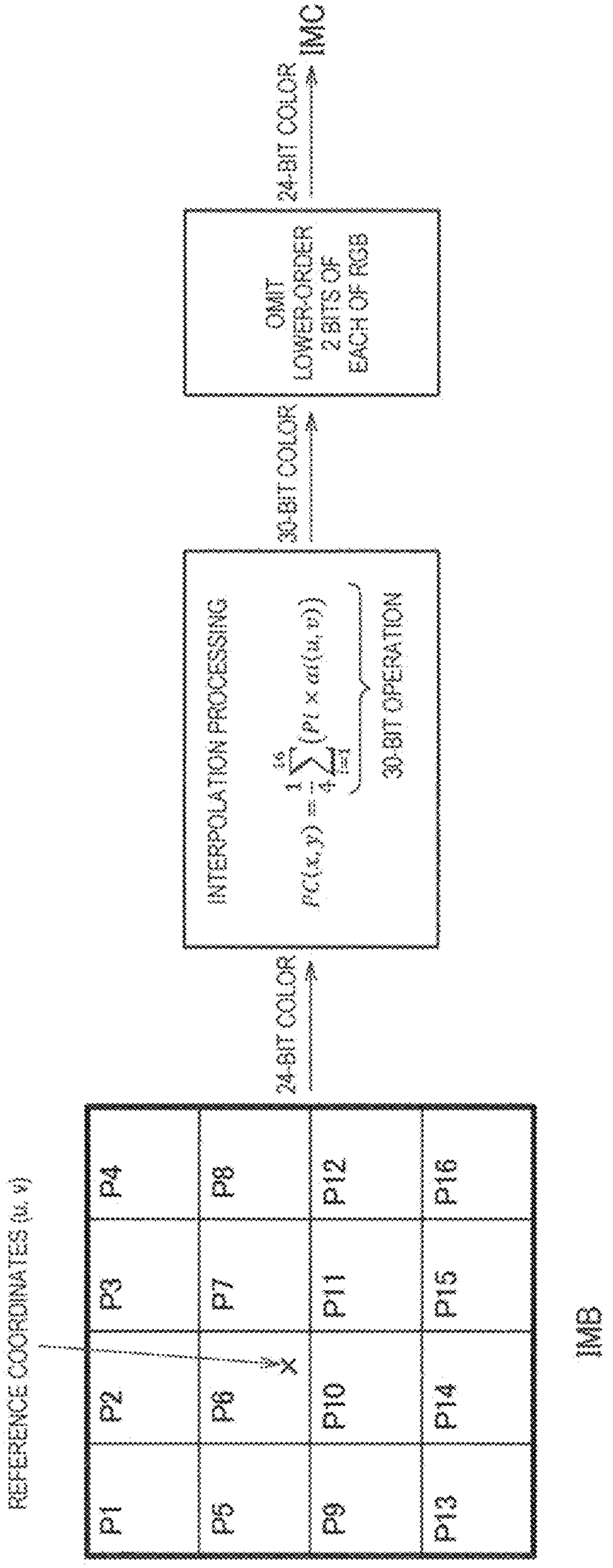
FIG. 10 is a first example of the interpolation processing in the second detailed configuration example.

FIG. 10 shows a first example of the interpolation processing in the second detailed configuration example. The interpolation circuit 114 executes the interpolation processing by the 30-bit operation similarly as in the first detailed configuration example, and obtains the 30-bit color pixel data PC (x, y). The interpolation circuit 114 omits lower-order 2 bits from each 10-bit color data of the pixel data PC (x, y) to obtain 24-bit color pixel data. The distortion correction circuit 110 outputs the 24-bit color pixel data as pixel data of the output image data IMC.

Figure 11:
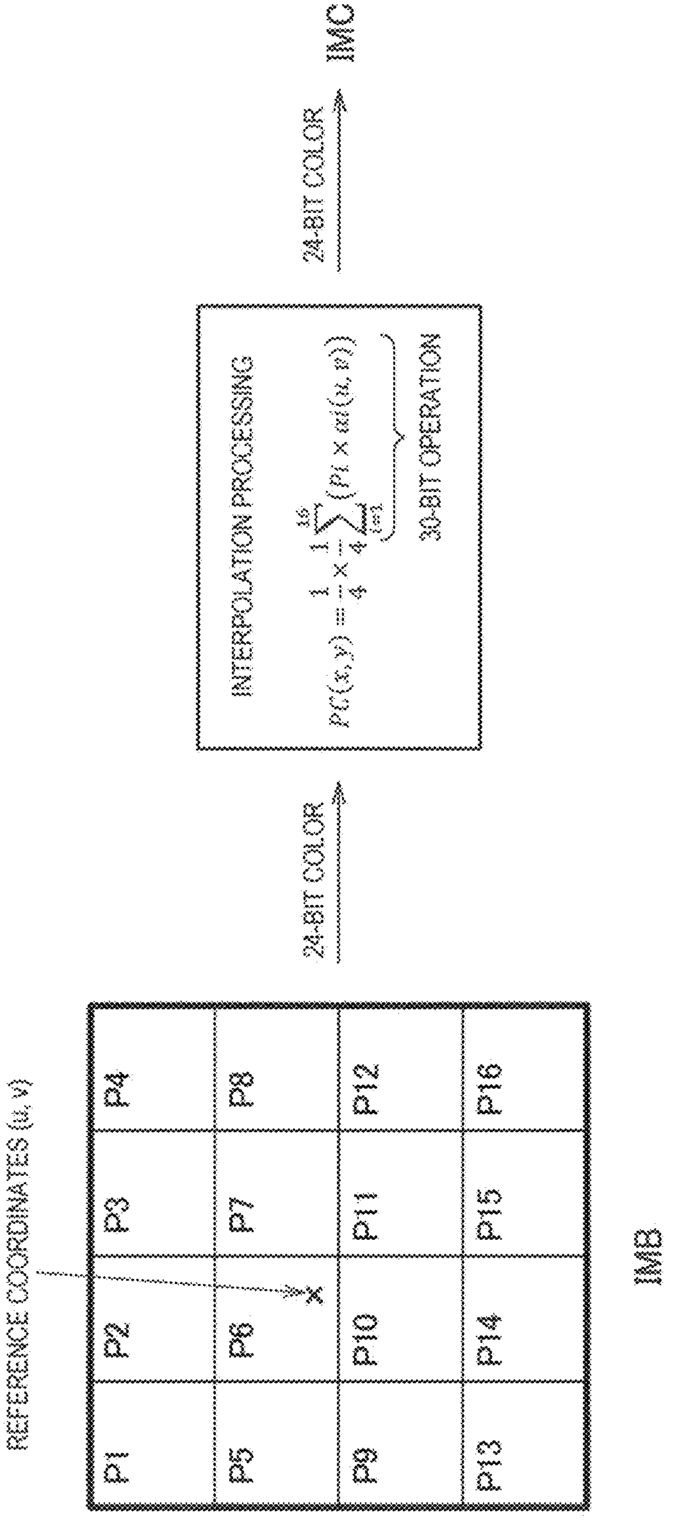
FIG. 11 is a second example of the interpolation processing in the second detailed configuration example.

FIG. 11 shows a second example of the interpolation processing in the second detailed configuration example. The interpolation circuit 114 obtains a product sum of pixel data Pi and the interpolation coefficient αi by a 30-bit operation, and divides a result of the product sum of the 30 bits by 16 to obtain the 24-bit color pixel data PC (x, y). Due to $\alpha 1+\alpha 2+\ldots+\alpha 6=4$, when a result of the product sum is divided by 16, it is equivalent to dividing each color data by 4, and each color data of 10 bits is color-reduced to data of 8 bits. The distortion correction circuit 110 outputs the 24-bit color pixel data PC (x, y) as pixel data of the output image data IMC.

In the present embodiment, the same 24-bit color is used before and after the distortion correction, but the color is reduced to 24 bits after the interpolation processing is executed by the 30-bit operation in the distortion correction. Accordingly, at a time point of the 30-bit operation, as described with reference to FIG. 8, a distortion-corrected image with an improved gradation can be obtained while inheriting the effect of the error diffusion in the color-reduced image. By color-reducing the image to the 24-bit color, the effect of the error diffusion in the color-reduced image is appropriately reflected in the distortion-corrected image, and the distortion-corrected output image data IMC including gradation information corresponding to the 30-bit color can be obtained.

4. Third Detailed Configuration Example

Figure 12:
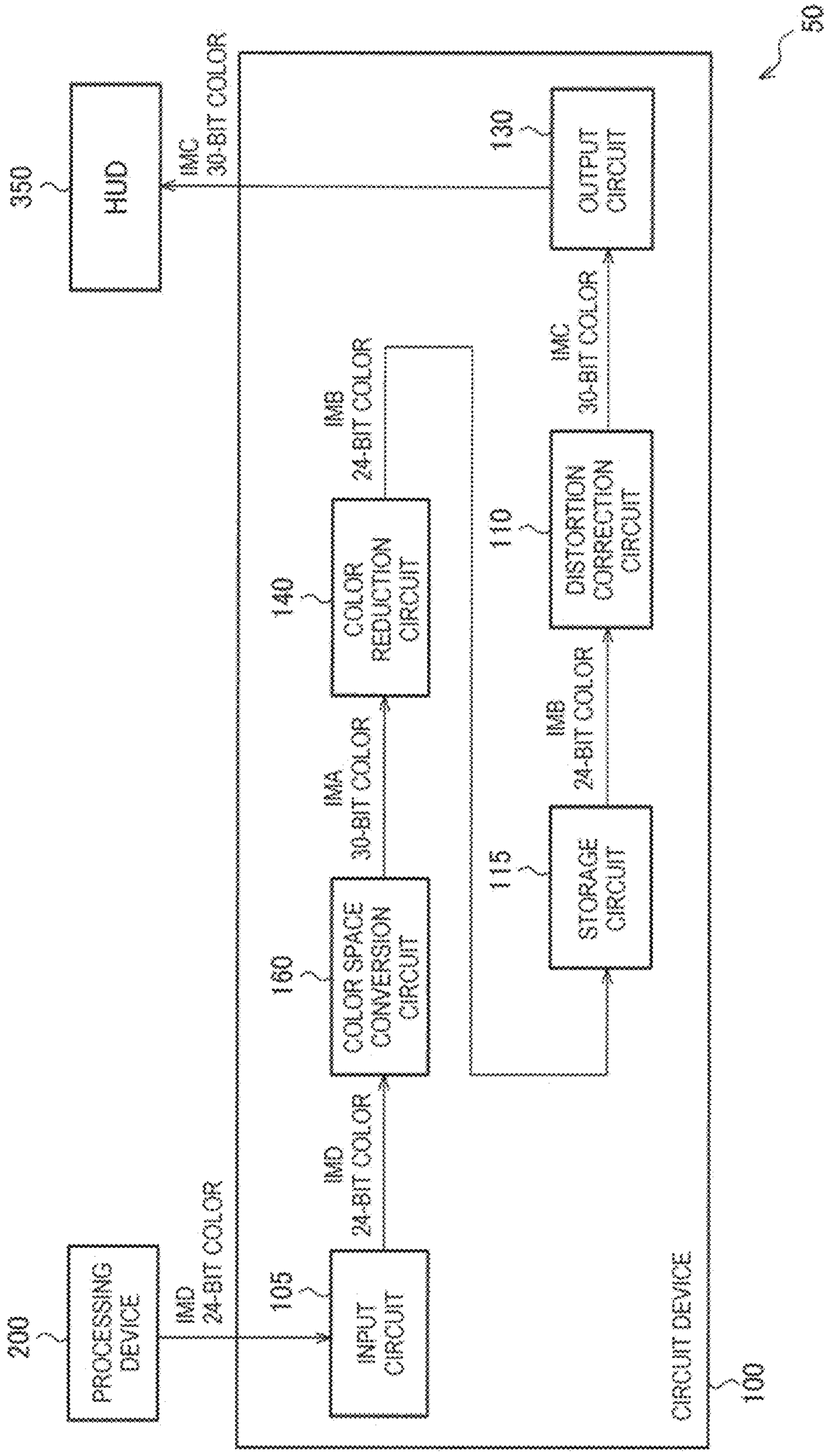
FIG. 12 is a third detailed configuration example of the display device and the circuit device.

FIG. 12 shows a third detailed configuration example of the display device 50 and the circuit device 100. In the third detailed configuration example, the circuit device 100 further includes a color space conversion circuit 160. Description of similar parts as those in the configuration example of FIG. 1 or FIG. 2 will be omitted.

The processing device 200 transmits 24-bit color image data IMD to the circuit device 100. The input circuit 105 receives the image data IMD from the processing device 200.

The color space conversion circuit 160 executes color space conversion on the 24-bit color image data IMD to output 30-bit color input image data IMA. Specifically, a color of the image data IMD is expressed in a predetermined color space. The color space conversion circuit 160 converts a predetermined color space of the image data IMD into an RGB color space. For example, it is assumed that a predetermined color space is YUV, YUV components of pixel data in the image data IMD are DDy, DDu, and DDv, and RGB components of the pixel data in the input image data IMA are DAr, DAg, and DAb. The color space conversion circuit 160 multiplies the pixel data (DDy, DDu, DDv) of the image data IMD by a transformation matrix of three rows and three columns indicating color space conversion to obtain the pixel data (DAr, DAg, DAb) of the input image data IMA.

In the above description, the image data IMD has a 24-bit color, and the input image data IMA has a 30-bit color, but the present disclosure is not limited to this. When m is an integer of 2 or more and k is an integer of 1 or more and less than m, the image data IMD may have a k-bit color, and the input image data IMA may have an m-bit color.

In the present embodiment, the circuit device 100 includes the color space conversion circuit 160. The color space conversion circuit 160 executes color space conversion on the image data IMD in which the pixel data is k bits to generate the input image data IMA in which the pixel data is m bits.

According to the present embodiment, when image data IMD in a color space other than an RGB color space is input to the circuit device 100, the image data IMD can be converted into image data in the RGB color space. By bit-extending the pixel data from k bits to m bits in the color space conversion, the input image data IMA having a smooth gradation can be obtained without losing a gradation of the image data IMD as much as possible in the color space conversion. After the input image data IMA is temporarily color-reduced and stored in the storage circuit 115, the distortion correction is executed, so that the output image data IMC including the gradation information corresponding to gradation information of the input image data IMA can be obtained without increasing the storage capacity of the storage circuit 115.

The circuit device according to the present embodiment described above includes a color reduction circuit, a storage circuit, and an image conversion circuit. The color reduction circuit executes color reduction processing from input image data in which pixel data is m bits to color-reduced image data in which pixel data is n bits, and executes error diffusion processing in a space direction or in a time direction in the color reduction processing. m is an integer of 2 or more. n is an integer of 1 or more and less than m. The storage circuit stores the color-reduced image data. The image conversion circuit executes image conversion processing, which is at least one of mapping processing and scaling processing, on the color-reduced image data stored in the storage circuit to output output image data, and executes interpolation processing, which is in the image conversion processing, of generating pixel data of the output image data from a plurality of pieces of pixel data of the color-reduced image data.

According to the present embodiment, since the input image data is stored in the storage circuit after being color-reduced, a storage capacity is saved as compared with a case where the input image data is stored as it is in the storage circuit. Accordingly, cost of the circuit device can be reduced. By executing the error diffusion processing in the space direction or in the time direction in the color reduction processing, the image data is color-reduced to n-bit color while maintaining gradation information corresponding to m-bit color as an average of a range in which the error is diffused. By executing the interpolation processing in the image conversion processing on the color-reduced image data having the n-bit color, the pixel data is averaged in the space direction. Therefore, the output image data having a smoother gradation than the color-reduced image data can be obtained.

In the present embodiment, the image conversion circuit may convert, in the mapping processing, pixel coordinates on the output image data into reference coordinates on the color-reduced image data. The image conversion circuit may generate, from a plurality of pieces of pixel data around the reference coordinates in the color-reduced image data, pixel data of the pixel coordinates in the output image data.

Since the reference coordinates do not always match, in the mapping processing, the pixel grid of the color-reduced image data, it is necessary to execute interpolation from a plurality of pieces of surrounding pixel data. Since the pixel data is averaged in the space direction by the interpolation processing, the output image data with an improved gradation can be obtained while inheriting the effect of the error diffusion in the color-reduced image.

In the present embodiment, the image conversion circuit may execute, by the mapping processing, distortion correction processing on the color-reduced image data.

In the present embodiment, the distortion correction processing may be processing of correcting image distortion caused by an optical system of a head-up display which projects, based on the output image data, an image onto a projection surface.

According to the present embodiment, in the distortion correction processing, image distortion, which is opposite to image distortion when an image is projected by the head-up display, is applied to the image. Accordingly, the image distortion at the time of projection is canceled by the image distortion applied to the image by the distortion correction, and the head-up display without distortion or with reduced distortion can be obtained.

In the present embodiment, the color reduction circuit may execute error diffusion processing in the space direction. The image conversion circuit may generate, by the interpolation processing, the output image data in which the pixel data is m bits.

According to the present embodiment, after the m-bit color input image data is color-reduced to the n-bit color color-reduced image data, the color-reduced image data is stored in the storage circuit, and the m-bit color output image data is generated from the n-bit color color-reduced image data by the interpolation processing. By executing the multi-gradation from the n-bit color to the m-bit color by the interpolation processing, the output image data with an improved gradation can be obtained while inheriting the effect of the error diffusion in the color-reduced image data.

In the present embodiment, the color reduction circuit may execute frame rate control processing as the error diffusion processing in the time direction. The image conversion circuit may generate, by the interpolation processing, the output image data in which the pixel data is m bits.

In the frame rate control processing, the error is diffused not only in the time direction but also in the space direction, and the image data after the frame rate control processing includes information corresponding to m-bit color before the color reduction. Therefore, by executing the multi-gradation from the n-bit color to the m-bit color by the interpolation processing, the output image data with an improved gradation can be obtained while inheriting the effect of the error diffusion in the color-reduced image data.

In the present embodiment, the circuit device may include a color space conversion circuit. The color space conversion circuit may execute color space conversion on image data in which pixel data is k bits to generate the input image data in which pixel data is the m bits. k is an integer of 1 or more and less than m.

According to the present embodiment, when image data in a color space different from a color space of the output image data is input to the circuit device, the color space of the image data can be converted into the same color space as the color space of the output image data. By bit-extending the pixel data from k bits to m bits in the color space conversion, the input image data having a smooth gradation can be obtained without losing a gradation of the image data as much as possible in the color space conversion. After the input image data is temporarily color-reduced and stored in the storage circuit, the distortion correction is executed, so that the output image data including the gradation information corresponding to gradation information of the input image data can be obtained without increasing the storage capacity of the storage circuit.

In the present embodiment, the storage circuit may be a line buffer storing image data of a plurality of lines of the color-reduced image data, or is a frame memory storing frame image data of the color-reduced image data.

Both the line buffer and the frame memory are image memories, and thus have a relatively large storage capacity. For example, when the pixel data of the input image data increases from 24 bits to 30 bits, a storage capacity of 1.25 times is required, but according to the present embodiment, since the color is reduced to 24 bits, the storage capacity does not increase. Alternatively, when the pixel data of the input image data remains 24 bits, the storage capacity is saved by reducing the color to, for example, 18 bits.

A display device according to the present embodiment includes the circuit device; and an image display unit on which an image based on the output image data is displayed.

Although the present embodiment is described in detail above, it will be easily understood by those skilled in the art that many modifications can be made without substantially departing from the new matter and effects of the present disclosure. Accordingly, such modifications are intended to be in the scope of the present disclosure. For example, a term described at least once together with a different term having a broader meaning or the same meaning in the description or the drawings can be replaced with the different term in any place in the description or the drawings. All combinations of the present embodiment and the modifications are also in the scope of the present disclosure. Configurations, operations, and the like of the circuit device, the processing device, the image display unit, the display device, and the like are not limited to those described in the present embodiment, and various modifications can be made.

What is claimed is:

1. A circuit device comprising:

a color reduction circuit configured to execute color reduction processing from input image data in which pixel data is m bits, m being an integer of 2 or more, to color-reduced image data in which pixel data is n bits, n being an integer of 1 or more and less than m, and configured to execute error diffusion processing in a space direction or in a time direction in the color reduction processing;

a storage circuit storing the color-reduced image data; and an image conversion circuit configured to execute image conversion processing, which is at least one of mapping processing and scaling processing, on the color-reduced image data stored in the storage circuit to output output image data, and configured to execute interpolation processing, which is in the image conversion processing, of generating pixel data of the output image data from a plurality of pieces of pixel data of the color-reduced image data, wherein in the interpolation processing:

the color-reduced image data is converted into intermediate image data in which pixel data is the m bits; and a lower-order bit of each of RGB of the intermediate image data is omitted from the intermediate image data to form the output image data in which pixel data is the n bits.

2. The circuit device according to claim 1, wherein the image conversion circuit converts, in the mapping processing, pixel coordinates on the output image data into reference coordinates on the color-reduced image data, and generates, from a plurality of pieces of pixel data around the reference coordinates in the color-reduced image data, pixel data of the pixel coordinates in the output image data.

3. The circuit device according to claim 1, wherein the image conversion circuit executes, by the mapping processing, distortion correction processing on the color-reduced image data.

4. The circuit device according to claim 3, wherein the distortion correction processing is processing of correcting image distortion caused by an optical system of a head-up display which projects, based on the output image data, an image onto a projection surface.

5. The circuit device according to claim 1, wherein the color reduction circuit executes the error diffusion processing in the space direction, and the image conversion circuit generates, by the interpolation processing, the output image data in which pixel data is the m bits.

6. The circuit device according to claim 1, wherein the color reduction circuit executes frame rate control processing as the error diffusion processing in the time direction, and the image conversion circuit generates, by the interpolation processing, the output image data in which pixel data is the m bits.

7. The circuit device according to claim 1, further comprising:

a color space conversion circuit configured to execute color space conversion on image data in which pixel data is k bits, k being an integer of 1 or more and less than m, to generate the input image data in which pixel data is the m bits.

8. The circuit device according to claim 1, wherein the storage circuit is a line buffer storing image data of a plurality of lines of the color-reduced image data, or is a frame memory storing frame image data of the color-reduced image data.

9. A display device comprising:

the circuit device according to claim 1; and an image display unit on which an image based on the output image data is displayed.

10. A circuit device comprising:

a color reduction circuit configured to execute color reduction processing from input image data in which pixel data is m bits, m being an integer of 2 or more, to color reduced image data in which pixel data is n bits, n being an integer of 1 or more and less than m, and configured to execute error diffusion processing in a space direction or in a time direction in the color reduction processing;

a storage circuit storing the color reduced image data; and an image conversion circuit configured to execute image coordinate conversion processing, which is at least one of mapping processing and scaling processing, on the color reduced image data stored in the storage circuit to output output image data, and configured to execute interpolation processing, which is in the image coordinate conversion processing, of generating pixel data of the output image data from a plurality of pieces of pixel data of the color reduced image data.

* * * * *